Patented Oct. 24, 1944

2,361,329

UNITED STATES PATENT OFFICE 2,361,329

2-ALKYL-3-AMINO-5-PYRAZOLONES

Hans Stenzl and Alfred Staub, Basel, Switzerland, assignors to J. R. Geigy A. G., Basel, Switzerland No Drawing. Application January 13, 1942, Serial No. 426,638. In Switzerland July 31, 1941

5 Claims. (Cl. 260—310)

It has been found that, according to the usual processes of decomposition for the transformation of the carboxylic group into the amino group, there can be produced new valuable 3-aminopyrazolones as well as their carbalkoxy or carbamide derivatives from 2-alkyl-5-pyrazolone-3-carboxylic acids of the formula

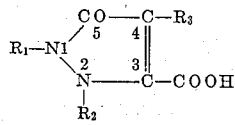

wherein $R_1$ means an aliphatic, araliphatic, hydroaromatic or aromatic radical, $R_2$ means an aliphatic radical and $R_3$ means hydrogen, halogen, an aliphatic, a saturated or unsaturated cycloaliphatic, an aromatic or an araliphatic radical, or from their suitable functional derivatives. The said compounds show distinctly antipyretical effects and, in contradistinction to the other pyrazolones used for therapeutic purposes, are substantially tasteless. The urethanes resulting as intermediate products in this manufacture in the presence of alcohols are especially efficacious, but on the other hand the corresponding urea derivatives may also be mentioned.

For the replacement of the carboxyl group by the amino group or substituted amino group the processes according to Hofmann and Curtius mainly come into consideration.

In the decomposition according to Curtius there is to be mentioned:

From the esters of the pyrazolone carboxylic acids of the type:

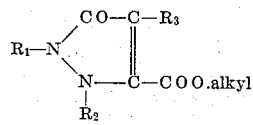

the hydrazides are advantageously obtained in the usual manner by the reaction of hydrazine. They are colorless, high-melting compounds which, for the most part, are difficultly soluble in water. Only in those cases where, in the positions 1 or 3, there stands a methyl group, the corresponding hydrazide is very easily soluble in water, but very difficultly soluble in absolute alcohol. By means of nitrite the hydrazides are converted in acid solution into the azides, which immediately precipitate out from the aqueous solution in form of a yellow crystalline powder which is somewhat sensitive to light. Only if in 4-position there is a methyl group, the azide is easily soluble in water and must then be shaken out with an organic solvent such as for example chloroform. At about 100° C. the azides are stormily decomposed, while in solution the same are decomposed already at a substantially lower temperature.

The azides can also be prepared directly from the halides of the corresponding acids by interaction with sodium azide. It is not necessary to isolate them in substance; instead thereof one can immediately dissolve them in a suitable solvent, for instance chloroform, dry the solution and boil it, after addition of an alcohol, until the azide is completely converted. The hydrazides can also be dissolved in alcoholic hydrochloric acid and, after introduction of ethyl nitrite and some standing, the formed azide can be converted by boiling into the urethane. The so-called shortened Curtius process (see Braun, Ber. 64 (1931) 2866 and British Patent 307,798) may also be used, but, in general, the method of isolation of the azide is preferable.

With respect to Hofmann's decomposing process there is to be mentioned that the same is facilitated in that the intermediarily formed halogen amides can, if desired, easily be isolated; they are strong acids with good crystallising properties.

The products of both the decomposition processes are colorless, well crystallised compounds. The urethanes are weak acids which readily dissolve in dilute caustic lye, but difficultly in ether. The 3-aminopyrazolones may be obtained therefrom by acid as well as by alkaline saponification. In Hofmann's decomposition process the said compounds can be obtained directly without isolation of the intermediate products.

The 3-aminopyrazolones are weak bases which, in contradistinction to the 4-aminoantipyrine, are rather difficultly soluble in water and absolutely stable to air. They mostly melt at about 200° C. and more. With ferric chloride they yield in alcoholic solution a red-brown coloration.

It is true that other processes of decomposition which have become known, e. g. over the corresponding hydroxamic acids lead also to these products, but they may not come into consideration for a technical preparation thereof.

The starting materials, the 2-alkyl-5-pyrazolone-3-carboxylic acids or their esters, amides or hydrazides, as far as they are now known, can be prepared according to usual processes, but preferably by means of alkylation of the 5-pyrazolone-3-carboxylic acid compounds which are unsubstituted in the 2-position. The esters may easily be obtained as well crystallized, weak bases, their melting points are between 70° C. and 110° C., if in the 1-position there stands a radical of the benzene series.

The 5-pyrazolone-3-carboxylic acid compounds coming into consideration for the preparation of the 2-alkyl-5-pyrazoline-3-carboxylic acid compounds are easily accessible from the corresponding oxalacetic acid esters. However, the 1-phenyl-4-hydroxypropyl-5-pyrazolone-3-carboxylic acid ester can also readily be obtained from 1-phenyl-5-pyrazolone-3-carboxylic acid ester by hydrogenation in the presence of acetone, analogously the corresponding 4-sec. butyl derivative can be obtained. The 1-phenyl-2-methyl-4-bromo-5-pyrazolone-3-carboxylic acid ester can, analogously to the 4-bromo-antipyrine, be directly obtained from the bromine-free ester. Also the 1-phenyl-4-allyl-5-pyrazolone-3-carboxylic acid ester is obtainable by direct allylation of the 1-phenyl-5-pyrazolone-3-carboxylic acid ester, but in this case the synthesis from allylacetic acid ester through the oxalallyl acetic acid ester is to be preferred.

Hydrazides of pyrazolone compounds, however, are already known, but their transformation to the corresponding amines has hitherto not yet been carried out. According to Kufferath (J. pr. Ch. 64, 337) the transformation of the pyrazolone-3-acetic acid hydrazide gives no result. From the fact that, on the other hand, the method of transformation of Curtius is usable for the pyrazol-3-carboxylic acid esters which because of their completely aromatic constitution are very stable, it can however not be concluded that the alkylation of the pyrazolone carboxylic acid esters in the 2-position leads to transformable compounds, since the same as partially hydrogenated ring systems are by far less stable than the pyrazol carboxylic acids.

The present invention is illustrated by the following examples, the parts being by weight, where nothing other is said.

Example 1

100 parts of 1-phenyl-2-methyl-5-pyrazolone-3-carboxylic acid hydrazide (M. P. 233° C.), obtained by digesting the ethyl ester with hydrazine hydrate, are dissolved in 600 parts of 2n-hydrochloric acid, whereupon a solution of 60 parts of sodium nitrite in 300 parts of water is slowly added thereto at —5° C.; the azide of the 1-phenyl-2-methyl-5-pyrazolone-3-carboxylic acid immediately precipitates out in form of a yellow crystal sand. It is filtered, carefully washed out with water and dried at a slow temperature (M. P. 95° C., decomposition). The azide thus obtained is dissolved in 10 parts of absolute alcohol and slowly warmed. At about 60° C. the nitrogen development begins to take place; as soon as this development diminishes, the whole is heated to boiling, whereby 1-phenyl-2-methyl-3-carbethoxy-amino-5-pyrazolone separates out for the greatest part in form of a difficultly soluble crystal powder of melting point 222° C.

If this urethane is boiled for 5 hours under reflux with four times the quantity of 2n-caustic lye, 1-phenyl-2-methyl-3-amino-5-pyrazolone slowly separates out in form of colorless needles of melting point 229.5° C.; it is soluble in dilute hydrochloric acid and can be recrystallised from dilute alcohol.

Example 2

If, in Example 1, the absolute alcohol is replaced by n-butyl alcohol, one obtains 1-phenyl-2-methyl-3-carbo-n-butoxyamino-5-pyrazolone in form of a crystal powder which can be recrystallised from dilute acetic acid or butyl alcohol (M. P. 194° C.).

Example 3

If, in Example 1, the ethyl alcohol is replaced by anhydrous glycol and if, after completion of the nitrogen development, the whole is diluted with water, 1-phenyl-2-methyl-3-carbo-hydroxyethoxy-amino-5-pyrazolone precipitates out; when crystallised from dilute alcohol, it is obtained in form of colorless little leaves of melting point 212° C.

Example 4

Analogously to Example 1, 1-phenyl-2-ethyl-5-pyrazolone-3-carboxylic acid hydrazide (M. P. 171° C.) is converted into the azide (M. P. 117° C., decomposition) and therefrom there is recovered the 1-phenyl-2-ethyl-3-carbethoxy-amino-5-pyrazolone (little leaves of melting point 213° C. which are difficultly soluble in alcohol) by means of absolute alcohol and the 1-phenyl-2-ethyl-3-carbo-isopropyloxy-amino-5-pyrazolone (M. P. 211° C.) by means of isopropyl alcohol.

From both esters there is readily produced by boiling with 2n-caustic soda lye 1-phenyl-2-ethyl-3-amino-5-pyrazolone of melting point 226° C., which is difficultly soluble in water, but easily soluble in alcohol.

Example 5

1 part of 1-phenyl-2-methyl-4-bromo-5-pyrazolone-3-carboxylic acid hydrazide (M. P. 183° C.) is dissolved in 6 parts of 2n-hydrochloric acid and then ⅓ part of sodium nitrite, dissolved in 2 parts of water, is mixed therewith at —5° C. The azide precipitates out in form of a yellow sand which detonates at 104° C. By boiling the azide with 10 parts of methyl alcohol, evaporating the methyl alcohol and then adding water thereto one obtains the 1-phenyl-2-methyl-3-carbomethoxy-amino-4-bromopyrazolone which is easily soluble in methanol and melts at 104° C.

Example 6

From 1-phenyl-2:4-dimethyl-5-pyrazolone-3-carboxylic acid ethyl ester (M. P. 96° C.) there is obtained, by interaction with hydrazine hydrate (for 6 hours at 100° C.), the 1-phenyl-2:4-dimethyl-5-pyrazolone-3-carboxylic acid hydrazide (M. P. 158–159° C.), which is easily soluble in water and difficultly soluble in absolute alcohol. Analogously to Example 1, there can be produced therefrom: 1-phenyl-2:4-dimethyl-3-carbomethoxy-amino-5-pyrazolone (M. P. 188–189° C.), which is difficultly soluble in methanol, and 1-phenyl-2:4-dimethyl-2-carbo-isopropyloxy-amino-5-pyrazolone (M. P. 157° C.). From both urethanes there results the 1-phenyl-2:4-dimethyl-3-amino-5-pyrazolone (M. P. 196° C.) by the action of boiling dilute caustic soda lye.

Example 7

1-phenyl-2-methyl-4-ethyl-5-pyrazolone-3-carboxylic acid ethyl ester (M. P. 72° C.) is converted into the hydrazide (M. P. 175° C.) which is difficultly soluble in water. This compound is transformed, as indicated in Example 1, into the azide and then by heating with methanol into the 1-phenyl-2-methyl-3-carbomethoxy-amino-4-ethyl-5-pyrazolone of melting point 144° C. This urethane is easily soluble in alcohol.

By boiling the said urethane with caustic soda lye there is obtained the 1-phenyl-2-methyl-3-amino-4-ethyl-5-pyrazolone of melting point 157°–158° C.

*Example 8*

1 - phenyl - 2 - methyl - 4 - isopropyl - 5 - pyrazolone-3-carboxylic acid ethyl ester (M. P. 73° C., made from 1-phenyl-5-pyrazolone-3-carboxylic acid ethyl ester by hydrogenation in acetone under a pressure of 50 atm. at 110° C. and subsequent methylation) is converted by heating with hydrazine, into the hydrazide (M. P. 113–115° C. when crystallised from water) and the same, as described in Example 1, transformed into the azide (M. P. 88°–90° C.). By heating with the corresponding alcohols one obtains:

1 - phenyl - 2 - methyl - 3 - carbomethoxy - amino-4-isopropyl-5-pyrazolone, M. P. 126° C., when crystallised from an alcohol-ether mixture;

1 - phenyl - 2 - methyl - 3 - carbethoxy - amino-4-isopropyl-5-pyrazolone, M. P. 141°–142° C.;

1 - phenyl - 2 - methyl - 3 - carbo - allyloxy-amino-4-isopropyl-5-pyrazolone, M. P. 102° C.;

1 - phenyl - 2 - methyl - 3 - carbo - isopropyloxy-amino-3-isopropyl-5-pyrazolone, M. P. 139°/140° C.;

1-phenyl-2-methyl-3-carbo-chloroethoxy - amino-4-isopropyl-5-pyrazolone, M. P. 135° C.;

1 - phenyl - 2 - methyl - 3 - carbo - hydroxyethoxy - amino-4-isopropyl-5-pyrazolone, M. P. 136° C.

From all the aforesaid urethanes there result, by means of boiling dilute caustic soda lye, the 1-phenyl - 2 - methyl - 3 - amino - 4 - isopropyl - 5-pyrazolone which, when crystallised from dilute alcohol, shows a melting point of 204° C.

*Example 9*

56 parts of 1-phenyl-2-methyl-4-isopropyl-5-pyrazolone-3-carboxylic acid hydrazide are dissolved in 400 parts of methyl alcoholic hydrochloric acid of 13 per cent strength and 20 parts of methyl nitrite dissolved in 200 parts of methanol are dropped thereto at 0° C. After a standing for 12 hours at room temperature the methyl alcohol is slowly distilled off, the residue solidifies on adding water thereto to a crystal sand which is then freed from a red dyestuff by means of ether and finally recrystallised from an alcohol-ether mixture, thus yielding the pure 1-phenyl - 2 - methyl - 3 - carbomethoxy - amino-4-isopropyl-5-pyrazolone of melting point 126° C.

*Example 10*

10 parts of the azide of the 1-phenyl-2-methyl-4-isopropyl - 5 - pyrazolone - 3 - carboxylic acid which is still humid from the filtering flask are dissolved in 50 parts of chloroform, dried for 1 to 2 hours at low temperature with calcium chloride, filtered, intermixed with 25 parts of methyl alcohol and slowly heated to boiling, then after half an hour the mixture is distilled off and water is added, whereupon the 1-phenyl-2-methyl-3-carbomethoxy-amino - 4 - isopropyl-5-pyrazolone solidifying after a short time is recrystallised from dilute alcohol.

*Example 11*

1-phenyl-4-sec.butyl-5-pyrazolone - 3 - carboxylic acid ethyl ester, made from 1-phenyl-5-pyrazolone-3-carboxylic acid ethyl ester by hydrogenation in methyl ethyl ketone at 110° C. and at a pressure of 100 atm., and having a melting point of 96° C., is converted, by heating with dimethyl sulfate, into the oily 1-phenyl-2-methyl-4-sec.butyl-5-pyrazolone - 3 - carboxylic acid ethyl ester and the same, by heating with hydrazine, transformed into the 1-phenyl-2-methyl-4-sec.butyl-5-pyrazolone - 3 - carboxylic acid hydrazide crystallising out very slowly. (Crystal powder somewhat soluble in water, M. P. 145° C.) The azide, prepared therefrom according to Example 1, may be obtained from a chloroform-ether mixture in form of well formed crystals of point of decomposition of 90° C. By heating said compound with 10 parts of methanol there is obtained the 1-phenyl-2-methyl-4-sec.butyl-3-carbomethoxy-amino - 5 - pyrazolone melting at 109° C. By boiling with dilute caustic soda lye there is obtained therefrom the 1-phenyl-2-methyl-3-amino-4-sec.butyl-5-pyrazolone in form of long prisms (M. P. 204° C., when recrystallised from dilute alcohol).

*Example 12*

1:4 - diphenyl-5-pyrazolone-3-carboxylic acid ethyl ester, prepared from phenyl oxalacetic acid diethyl ester with phenyl hydrazine, M. P. 144° C., is converted by heating with dimethyl sulfate into the 1:4-diphenyl-2-methyl-5-pyrazolone-3-carboxylic acid ethyl ester (M. P. 107° C.) and the latter by heating with hydrazine into the hydrazide. This compound is obtained in a well crystallised form by triturating with ether; it can be obtained from an alcohol ether mixture with a melting point of 75° C. (escapement of crystal ether); in vacuo at room temperature it becomes greasy, obviously losing crystal ether. As described in the above examples, there is obtained therefrom the 1:4-diphenyl-2-methyl-5-pyrazolone-3-carboxylic acid hydrazide (M. P. 97° C., decomposition) and from this compound the 1:4 - diphenyl - 2 - methyl-3-carbomethoxy-amino-5-pyrazolone (M. P. 174–175° C. when recrystallised from alcohol) by heating it in methanol. By alkaline cleavage there results the 1:4-dipheynl-2-methyl-3-amino-5-pyrazolone which, when crystallised from alcohol, yields broad needles of melting point 241° C. When starting from 1:2-dimethyl-4-phenyl-5-pyrazolone-3-carboxylic acid ethyl ester one obtains in exactly the same manner the 1:2-dimethyl-4-phenyl-3-amino-5-pyrazolone.

*Example 13*

In the same manner as described in Example 2 one obtains, by using benzyl oxalacetic acid diethyl ester through the 1-phenyl-4-benzyl-5-pyrazolone-3-carboxylic acid ethyl ester (M. P. 195°–196° C.) the 1-phenyl-2-methyl-4-benzyl-5-pyrazolone-3-carboxylic acid ethyl ester, melting point 110° C., and from this latter compound the hydrazide of melting point 191–192° C., difficultly soluble in alcohol, therefrom the azide (detonating at about 110° C.), then the 1-phenyl-2-methyl-3-carbomethoxy-amino - 4 - benzyl-5-pyrazolone (melting point 158°–159° C. when recrystallised from alcohol) and finally the 1-phenyl-2-methyl-3-amino-4-benzyl-5-pyrazolone (melting point 137° C.).

From 1-phenyl-2-methyl-4-allyl - 5 - pyrazolone-3-carboxylic acid ethyl ester there results in exactly the same manner the 1-phenyl-2-methyl-4-allyl-3-carbomethoxy-5-pyrazolone.

*Example 14* p-Tolyl hydrazine is converted by means of oxalacetic acid ester into 1-(4'-methylphenyl)-

5-pyrazolone-3-carboxylic acid ethyl ester (melting point 188° C.) and this compound transformed by hydrogenation in acetone at 110° C. and under a pressure of 100 atm. into the 1-(4'-methylphenyl-4-isopropyl-5 - pyrazolone - 3 - carboxylic acid ethylester (M. P. 110° C.). By usual methylation the 1-(4'-methylphenyl)-2-methyl-4-isopropyl-5-pyrazolone-3-carboxylic acid ethyl ester (melting point 101° C.) is obtained therefrom and converted by means of hydrazine into the hydrazide (melting point 96° C.). Through the azide (melting point 92° C., decomposition) one obtains as in Example 1 the 1-(4'-methylphenyl)-2-methyl-3-carbomethoxy-amino-4-isopropyl-5-pyrazolone (M. P. 191.5° C.) and from this latter by alkaline or acid hydrolysis the 1-(4'-methylphenyl)-2-methyl-3-amino-4-isopropyl-5-pyrazolone (M. P. 205° C.). If, in the above example, p-methyl-cyclohexyl- or cyclohexyl hydrazine is used instead of p-tolyl hydrazine, the reaction takes place in an analogous manner.

Example 15

1:2-dimethyl-5-pyrazolone-3-carboxylic acid ethyl ester, obtained from 1-methyl-5-pyrazolone-3-carboxylic acid ethyl ester by heating with two molecules of dimethyl sulfate in form of a water-soluble oil which solidifies at a temperature below 0° C., is converted by treating with hydrazine into the hydrazide (melting point 204° C.) which is readily soluble in water, but difficultly soluble in absolute alcohol and ether. The azide, made according to Example 1, is water-soluble and can be removed from the solution neutralised with sodium carbonate by means of chloroform. On evaporation of the chloroform the azide remains in form of yellow long needles detonating at 110° C. By heating in methanol the 1:2-dimethyl-3-carbomethoxy-amino- 5 -pyrazolone of melting point 200° C. is obtained.

The 1-benzyl-2-methyl-5-pyrazolone-3-carboxylic acid ethyl ester reacts in exactly the same manner.

Example 16

10 parts of 1-phenyl-2-methyl-4-isopropyl-5-pyrazolone-3-carboxylic acid azide are slowly heated up to 90°–100° C. with 0.5 part of water and 100 parts of toluene until the development of nitrogen has completed, then the toluene is distilled off in vacuo and there is obtained a residue which, for the greater part, consists of 1-phenyl-2-methyl-3-amino-4-isopropyl-5-pyrazolone and, for the minor part, of bis-(1-phenyl-5-oxy-2-methyl-4-isopropyl-pyrazolidene(-3) urea (melting at 165° C. when recrystallised from alcohol). The whole is either heated with 2n-caustic soda lye, until the urea is saponified and 1-phenyl-2-methyl-3-amino-4-isopropyl-5-pyrazolone is present in uniform condition, or the alkali-soluble urea is separated off by stirring with caustic soda lye and precipitated out from the filtrate by means of acids (melting point 165° C.).

The azide can also be heated with alcohol containing water, whereby one obtains a mixture which consists of amino pyrazolone, its urethane and its urea, and which is preferably saponified by boiling caustic soda lye to the amino pyrazolone.

The azides described in the other examples react in exactly the same way.

Example 17

11 parts of 1-phenyl-2-methyl-5-pyrazolone-3-carboxylic acid amide made from the ethyl ester by allowing the same to stand for 12 hours with alcoholic ammonia, melting point 197° C., are combined with 130 parts by volume of an ice-cold hypochlorite solution (made by introducing 55 parts of chlorine into an aqueous solution of 100 parts of caustic soda and filling up to 1000 parts). The dissolution takes place rapidly, whereupon 100 parts by volume of a n-caustic soda lye are added to the solution and the whole is allowed to stand for half an hour and heated for a short time on the water-bath. 1-phenyl-2-methyl-3-amino-5-pyrazolone precipitates out. The rest can be recovered by evaporation of the neutralised filtrate.

Example 18

6 parts of 1:4-diphenyl-2-methyl-5-pyrazolone-3-carboxylic acid amide (melting point 291° C., very difficultly soluble in alcohol), made from the ester by heating up to 130° C. with alcoholic ammonia in a closed vessel, are suspended with 40 parts by volume of alcohol and mixed with 60 parts by volume of hypochlorite solution (made as indicated in Example 17). Under self-heating all is dissolved. Then, one filters off from a little quantity of non-converted substance, adds 50 parts by volume of n-caustic soda lye thereto and heats up to about 80° C. 1:4-phenyl-2-methyl-3-amino-5-pyrazolone is thus precipitated out.

Instead of the amides or azides there may also be used in the above examples the reaction products from the carboxylic acids, esters, halides etc. with hydrazoic acid, as it is described in the British Patent No. 307,798.

What we claim is:

1. The 2-alkyl-3-amino-5-pyrazolones in which the 3-amino substituent is selected from the group consisting of —NH$_2$, —NH.CO.O.alkyl and —NH.CO.NH.Py wherein Py means the pyrazolone radical connected with the third valence of the —NH- group standing at the beginning of the last formula.

2. The primary 3-amino-2-alkyl-5-pyrazolones.
3. The 3-carbalkoxyamino-2-alkyl-5-pyrazolones.
4. The 1-phenyl-2-methyl-3-amino-4-isopropyl-5-pyrazolone.
5. The 1-phenyl-2-methyl-3-carbomethoxy-amino-4-isopropyl-5-pyrazolone.

HANS STENZL.
ALFRED STAUB.